United States Patent
Iguchi et al.

(12)

(10) Patent No.: US 6,276,447 B1
(45) Date of Patent: Aug. 21, 2001

(54) APPARATUS FORMED BY BRAZING AND METHOD FOR MANUFACTURING THE SAME

(75) Inventors: Takeshi Iguchi, Gifu; Homare Kotate; Akira Uchikawa, both of Nagoya; Kouji Hirakami, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/306,344

(22) Filed: May 6, 1999

(30) Foreign Application Priority Data

May 12, 1998 (JP) .................................. 10-129172

(51) Int. Cl.[7] .............................. F28F 13/18; F28F 9/04; B23K 31/00
(52) U.S. Cl. ...................... 165/178; 165/133; 29/890.054
(58) Field of Search ...................... 29/890.054; 165/133, 165/109.1, 151, 177, 178

(56) References Cited

U.S. PATENT DOCUMENTS

| 4,272,006 | * | 6/1981 | Kao ........................................ 165/178 |
| 5,203,407 | * | 4/1993 | Negasaka .............................. 165/174 |
| 5,228,727 | * | 7/1993 | Tokutake et al. ..................... 165/178 |
| 5,555,929 | * | 9/1996 | Ishikawa ............................... 165/178 |
| 5,632,161 | * | 5/1997 | Shimoya et al. ........................ 62/515 |
| 5,758,904 | * | 6/1998 | Ross et al. .............................. 285/23 |
| 5,761,808 | * | 6/1998 | Patel et al. ....................... 29/890.054 |

FOREIGN PATENT DOCUMENTS

| 4318058 | * | 12/1994 | (DE) . |
| WO 93/15369 | * | 8/1993 | (WO) .............................. 29/890.054 |

* cited by examiner

Primary Examiner—Ira S. Lazarus
Assistant Examiner—Tho Duong
(74) Attorney, Agent, or Firm—Harness, Dickey & Pierce, PLC

(57) ABSTRACT

A tube is formed by brazing first and second plates, and is connected to a pipe through a connection block being brazed to a contacting surface of the first plate. A brazing material is clad on an inner surface of the first plate opposite to the contacting surface, and a hole penetrating through the first plate is formed in the first plate at a position corresponding to the connection block. Thus, during brazing, the brazing material clad on the inner surface of the first plate is supplied to the contacting surface through the hole by capillary phenomenon, so that the connection block is brazed to the first plate. As a result, an apparatus formed by brazing plural metal members, such as the tube of an oil cooler, is produced in low cost.

8 Claims, 3 Drawing Sheets

_US 6,276,447 B1_

APPARATUS FORMED BY BRAZING AND METHOD FOR MANUFACTURING THE SAME

CROSS-REFERENCE TO RELATED APPLICATION

This application is related to and claims priority from Japanese Patent Application No. Hei. 10-129172 filed on May 12, 1998, the contents of which are hereby incorporated by reference.

BACKGROUND OF THE INVENTION

1. Field of the Invention

The present invention relates to an apparatus which is formed by brazing plural metal members, and a brazing method for manufacturing the apparatus. The present invention is suitable for a case where a brazing material can be clad or applied on only one surface of a metal member, or a case where a brazing material can be clad or applied on both surfaces of the metal member while a core plate of the metal member is made thicker by thinning the brazing material on one surface of the metal member.

2. Description of Related Art

As a method for brazing two metal members, contacting surfaces of the two metal members are generally clad or applied with a brazing material. However, in a case where only one surface of the metal member can be clad or applied with the brazing material from characteristics of a product, the method may be difficult to form the product by brazing plural metal members.

For example, as shown in FIGS. 3A–3C, a brazing material R is clad on an inner surface 11b of a plate 11, and the inner surface 11b of the plate 11 is brazed to an another plate (not shown) using the brazing material R so that a tube 10 is formed. When a connection block 12 for connecting a pipe (not shown) to the tube 10 is brazed to the plate 11, a brazing material is clad on a contacting surface of the block 12, contacting the plate 11, or is clad on a contacting surface 11a of the plate 11. Because the connection block 12 is necessary to form a female screw portion 12a through a mechanical step (i.e., screw forming step), it is impossible to cold the brazing material on the contacting surface of the block 12. Therefore, a sheet-like brazing material is clad on the contacting surface 11a of the plate 11 as shown in FIG. 3A, a ring like brazing material is provided at a corner between the connection block 12 and the plate 11 as shown in FIG. 3B, or a paste like brazing material is applied on the corner between the connection block 12 and the plate 11 as shown in FIG. 3C.

Thus, in addition to the brazing material for forming the tube 10, an another brazing material for brazing the connection block 12 to the plate 11 is also necessary. Therefore, brazing steps are increased, and an apparatus formed by brazing plural metal members, such as a heat exchanger, is produced in high cost.

SUMMARY OF THE INVENTION

In view of the foregoing problems, it is an object of the present invention to provide an apparatus which is produced by brazing plural metal members in low cost.

According to the present invention, an apparatus includes a first metal member and a second metal member being bonded to the first metal member on a first surface of the first metal member. In the first metal member of the apparatus, there is formed a hole penetrating through the first metal member from the first surface to a second surface of the first metal member, opposite to the first surface. A brazing material is clad on the second surface of the first metal member at least at a position around the hole. Thus, during a brazing, a part of the brazing material is supplied to the first surface between the first metal member and the second metal member through the hole. As a result, the first and second metal members are readily brazed and bonded to each other, so that the apparatus can be readily produced in low cost.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
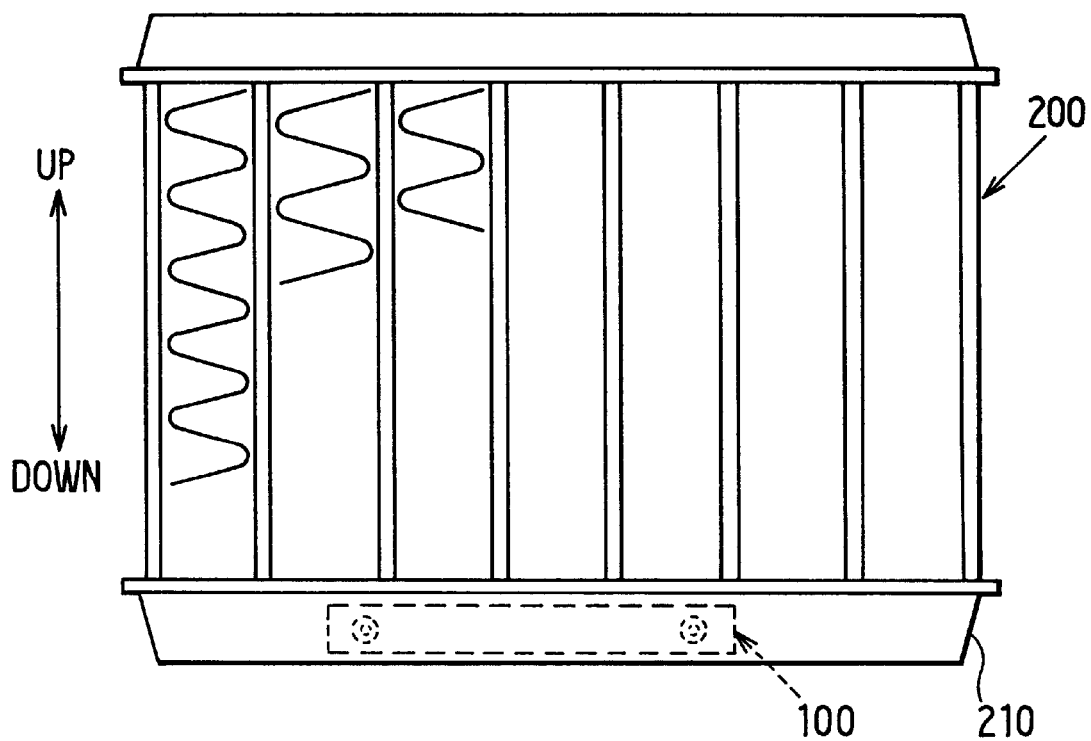
FIG. 1 is a front view showing a radiator and an oil cooler according to a preferred embodiment of the present invention.

A preferred embodiment of the present invention is described hereinafter with reference to FIGS. 1–2B. In the embodiment, the present invention is typically applied to an oil cooler (i.e., heat exchanger) for cooling an automatic transmission oil (hereinafter, referred to as "AT oil"). As shown in FIG. 1, the oil cooler 100 is disposed within a lower tank 210 of a radiator 200 for cooling engine-cooling water.

Figure 2A:
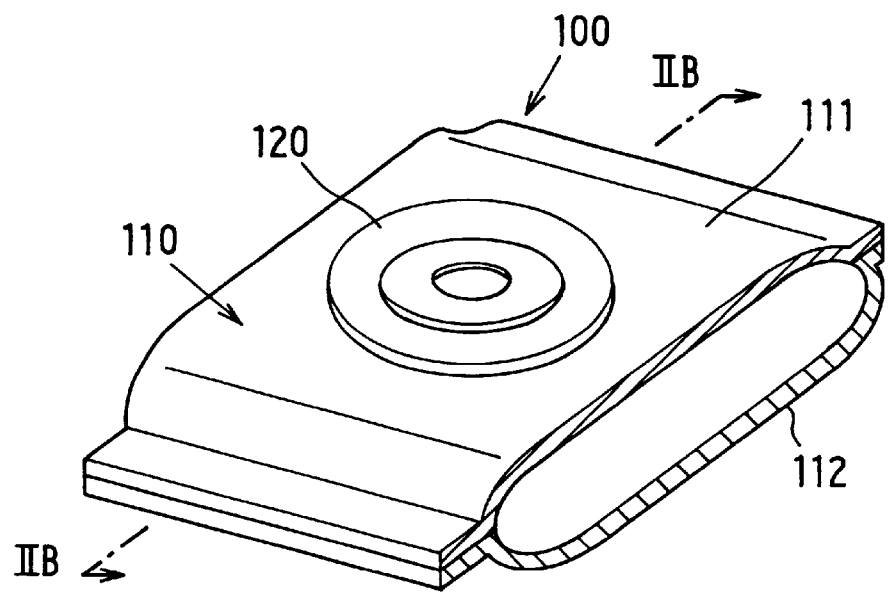
FIG. 2A is a sectional perspective view of a tube of the oil cooler.

As shown in FIG. 2A, the oil cooler 100 includes a flat tube 110 in which AT oil flows, and a connection block 120 made of metal. The tube 110 is connected to a pipe (not shown) through the connection block 120. The tube 110 is formed by bonding first and second plates 111, 112 through brazing, and an inner fin (not shown) is disposed between the first and second plates 111, 112 to be brazed between the first and second plates 111, 112. The connection block 120 is bonded to the first plate 111 by brazing.

Figure 2B:
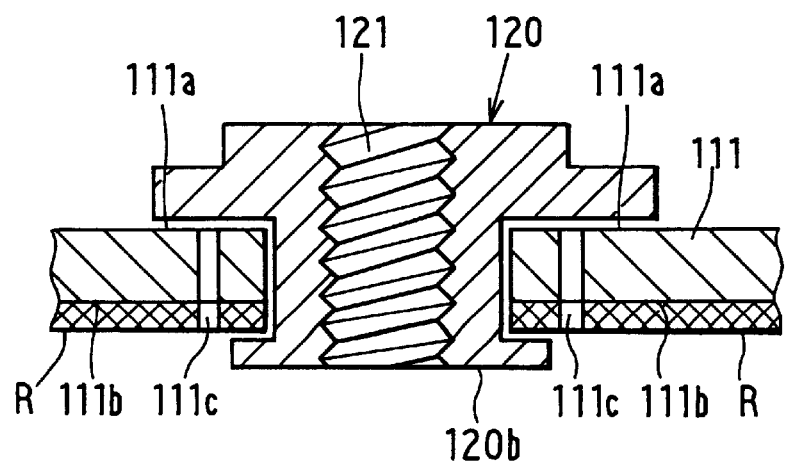
FIG. 2B is a cross-sectional view taken along line IIB—IIB in FIG. 2A.
Figure 3A:
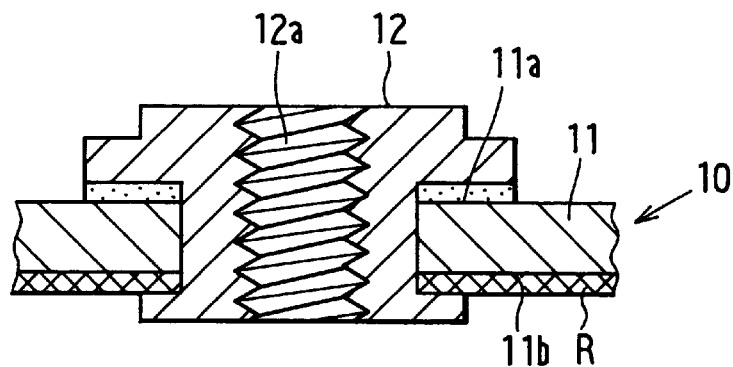
FIGS. 3A, 3B, 3C are schematic sectional view showing a conventional brazing method.
Figure 3B:
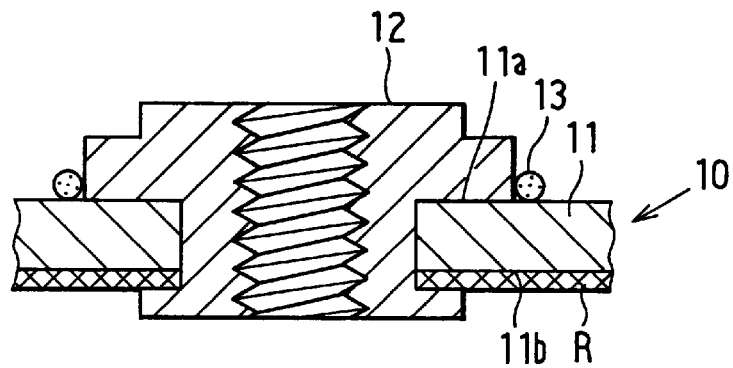
Figure 3C:
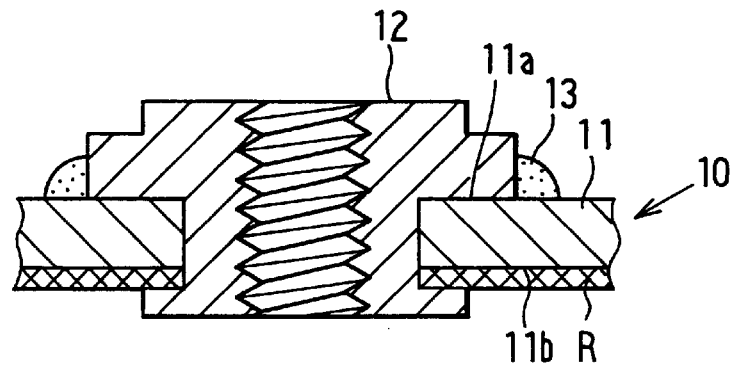

The connection block 120 is formed by cutting, and a female screw portion 121 for connecting the pipe and the tube 100 is formed at an approximately center portion of the connection block 120, as shown in FIG. 2B. A hole 111c penetrating through the first plat 111 is provided in the first plate 111 at a position contacting the connection block 120. That is, the hole 111c penetrates through the first plate 111 from the contacting surface 111a to an inner surface 111b of the first plate 111, as shown in FIG. 2B.

The both first and second plates 111, 112 are brazed to be connected with the brazing material R clad on the inner surface 111b of the first plate 111. When the first plate 111 and the connection block 120 are brazed in a furnace, the brazing material R clad on the inner surface 111b of the first plate 111 is supplied to the contacting surface 111a through the hole 111c by capillary phenomenon.

Next, a method for manufacturing the oil cooler 100 will be now described. An aluminum plate clad with the brazing material R on one surface corresponding to the inner surface 111b is pressed so that the first plate 111 with the hole 111c is formed in a first plate forming step. An aluminum bare plate without being clad with the brazing material is pressed so that the second plate 112 is formed in a second plate forming step. Further, the connection block 120 is formed through cutting in a block forming step.

Next, both of the first and second plates 111, 112 and the connection block 120 are temporarily assembled by a jig (not shown), and are brazed in the furnace to be bonded. At this time, the first and second plates 111, 112 are brazed by the brazing material clad on the inner surface 111b of the first plate 111, and the first plate 111 and the connection block 120 are brazed and bonded by the brazing material R supplied from the inner surface 111b to the contacting surface 111a through the hole 111c by the capillary phenomenon.

In the embodiment of the present invention, an end portion 120b of the connection block 120 is inserted into the inner surface 111b of the first plate 111, and is plastically deformed to be engaged with the inner surface 111b as shown in FIG. 2B, so that the connection block 120 and the first plate 111 is temporarily fixed.

According to the present invention, the hole 111c penetrating through the first plate 111 from the contacting surface 111a to the inner surface 111b of the first plate 111 is formed. Therefore, the brazing material R clad on the inner surface 111b of the first plate 111 is readily supplied to the contacting surface 111a contacting the connection block 120 through the hole 111c by the capillary phenomenon. Thus, the first plate 111 and the connection block 120 can be readily brazed with a simple method, and the oil cooler 100 is produced in low cost.

In the first embodiment, because the oil cooler 100 is disposed within the lower tank 210 of the radiator 200, an outer wall surface of the tube 111 (i.e., the first and second plates 111, 112) is need to perform an anti-corrosion treatment. Therefore, for brazing the first plate 111 and the connection block 120, a brazing material cannot be applied on an entire outer wall surface of the first plate 111a (tube 110) including the contacting surface 111a. However, according to the embodiment, a brazing material is not applied on the outer wall surface of the tube 110. Therefore, the anti-corrosion treatment can be performed on the outer wall surface of the tube 110 (i.e., the plates 111, 112). As the anti-corrosion treatment, a sacrifice corrosion layer may be formed on the outer wall surface of the tube 110 (i.e., plates 111, 112).

Although the present invention has been fully described in connection with the preferred embodiment thereof with reference to the accompanying drawings, it is to be noted that various changes and modifications will become apparent to those skilled in the art.

For example, in the above-described embodiment, the brazing method is applied to the oil cooler 100. However, the present invention may be applied to an apparatus formed by brazing plural members. Further, in the above-described embodiment, the present invention is applied to a case where the brazing material can be clad or applied on only one surface of the first plate 111. However, the present invention can be applied to a case where a brazing material can be clad or applied on both surfaces of a metal member while a core plate of the metal member is made thicker by thinning the brazing material on one surface of the metal member.

In the above-described embodiment, the brazing material R is clad on the entire inner surface 111b of the first plate 111. However, to perform the brazing connection between the first plate 111 and the connection block 120, the brazing material may be clad on the inner surface at least at a position corresponding to the hole 111c, or may be clad on at least at a position around the hole 111c.

Further, in the above-described embodiment, the hole 111c formed in the first plate 111 penetrates through the first plate 111 including the contacting surface 111a and the inner surface 111b, and the brazing material as shown in FIG. 2B. That is, the hole 111c is formed by pressing after the brazing material is clad on the inner surface 111b of the first plate 111. However, the hole 111c may be not provided in the brazing material R to extend from the contacting surface 111a to the inner surface 111b of the plate 111. That is, the blazing material may be clad on the inner surface 111b of the first plate 111 after the hole 111c is formed by pressing.

Such changes and modifications are to be understood as being within the scope of the present invention as defined by the appended claims.

What is claimed is:

1. An apparatus comprising:
   a first metal member having a first surface and a second surface opposite to said first surface;
   a second metal member being bonded to said first metal member on said first surface contacting said second metal member;
   a first hole penetrating through said first metal member, into which said second metal member is inserted;
   a second hole penetrating through said first metal member from said first surface to said second surface, said second hole being provided at a position different from said first hole; and
   a brazing material clad on said second surface of said first metal member at least at a position around said second hole,
   wherein said first metal member and said second metal member are bonded to each other during a brazing, by using a part of the brazing material supplied to said first surface of said first metal member through said second hole.

2. The apparatus according to claim 1, wherein said brazing material is provided in said second hole.

3. The apparatus according to claim 1, wherein said brazing material is clad on an entire second surface of said first metal member.

4. The apparatus according to claim 3, further comprising
   a third metal member being bonded to said first metal member on said second surface of said first metal member using said brazing material.

5. A heat exchanger for performing heat-exchange, said heat exchanger comprising:
   a tube in which a fluid flows;
   a pipe, connected to said tube, for supplying or discharging the fluid; and
   a connection member through which said pipe is connected to said tube, wherein:
   said tube includes
      a first plate having a first surface outside said tube and a second surface inside said tube,
      a first hole penetrating through said first plate, into which said connection member is inserted,
      a second hole penetrating through said first plate from said first surface to said second surface, said second hole being provided at a position different from said first hole,
      a brazing material clad on said second surface of said first plate at least at a position around said second hole; and a second plate bonding to said first plate to form a passage through which the fluid flows, said second hole is formed in said first plate of said tube in such a manner that the brazing material is supplied to said first surface of said first plate between said first plate and said connection member through said second hole during a brazing.

6. The apparatus according to claim 1, wherein:

said second metal member has a flange being bonded onto said first surface of said first metal member; and said second hole is provided in said first metal member at a position facing said flange.

7. The apparatus according to claim 1, wherein said second hole is provided at a position proximate to said first hole in said first metal member.

8. The heat exchanger according to claim 5, wherein:

the heat exchanger is disposed in a tank of a radiator for cooling an engine-cooling water; and said tube further includes a sacrifice corrosion layer provided on said first surface of said first plate.

* * * * *